(12) United States Patent
Blanc

(10) Patent No.: US 10,693,150 B2
(45) Date of Patent: Jun. 23, 2020

(54) STACK FOR MANUFACTURING BIPOLAR PLATES FOR FUEL CELLS

(71) Applicant: COMPAGNIE GENERALE DES ETABLISSEMENTS MICHELIN, Clermont-Ferrand (FR)

(72) Inventor: Claude Blanc, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 165 days.

(21) Appl. No.: 15/746,979

(22) PCT Filed: Jul. 28, 2016

(86) PCT No.: PCT/EP2016/068093
§ 371 (c)(1),
(2) Date: Jan. 23, 2018

(87) PCT Pub. No.: WO2017/025347
PCT Pub. Date: Feb. 16, 2017

(65) Prior Publication Data
US 2019/0013526 A1    Jan. 10, 2019

(30) Foreign Application Priority Data

Aug. 7, 2015   (FR) ..................................... 15 57597

(51) Int. Cl.
*H01M 8/0206* (2016.01)
*H01M 8/0254* (2016.01)
(Continued)

(52) U.S. Cl.
CPC ......... *H01M 8/0206* (2013.01); *H01M 8/026* (2013.01); *H01M 8/0228* (2013.01);
(Continued)

(58) Field of Classification Search
None
See application file for complete search history.

(56) References Cited

U.S. PATENT DOCUMENTS

2005/0095492 A1* 5/2005 Frank .................... H01M 8/026
429/434
2006/0166053 A1* 7/2006 Badding ............. H01M 8/0271
429/429
(Continued)

FOREIGN PATENT DOCUMENTS

DE    10 2011 116 997 A1    4/2013
WO    WO 2007/135507 A1    11/2007
WO    WO 2012/163842 A1    12/2012

OTHER PUBLICATIONS

International Search Report issued by WIPO dated Nov. 3, 2016, in connection with International Application No. PCT/EP2016/068093 (with English translation attached).

(Continued)

*Primary Examiner* — Jonathan Crepeau
*Assistant Examiner* — Angela J Martin
(74) *Attorney, Agent, or Firm* — Venable LLP

(57) ABSTRACT

A stack is provided for manufacturing bipolar plates for fuel cells. Each bipolar plate includes two sheets that are in a superimposed position relative to each and separated by a layer of filler material between the two sheets. The stack includes, in an alternately arranged manner, bipolar plates and intermediate plates. At least one of the intermediate plates has a plurality of slots passing through the intermediate plate in a direction of a thickness of the intermediate plate.

10 Claims, 3 Drawing Sheets

(51) Int. Cl.
    *H01M 8/026*     (2016.01)
    *H01M 8/24*      (2016.01)
    *H01M 8/0228*    (2016.01)
    *H01M 8/0267*    (2016.01)

(52) U.S. Cl.
    CPC ....... *H01M 8/0254* (2013.01); *H01M 8/0267* (2013.01); *H01M 8/24* (2013.01); *Y02P 70/56* (2015.11)

(56)         References Cited

U.S. PATENT DOCUMENTS

| 2008/0268316 | A1* | 10/2008 | Park ................... H01M 8/0247 |
|              |     |         | 429/492 |
| 2008/0292916 | A1  | 11/2008 | Newman et al. ............... 429/12 |
| 2009/0117431 | A1  | 5/2009  | Obika et al. .................... 429/26 |
| 2014/0199608 | A1  | 7/2014  | Vincent et al. ............... 429/457 |
| 2016/0087299 | A1* | 3/2016  | Van Dyke ........... H01M 8/1004 |
|              |     |         | 429/535 |
| 2018/0145344 | A1  | 5/2018  | Blanc |

OTHER PUBLICATIONS

Written Opinion published by WIPO dated Feb. 16, 2017, in connection with International Application No. PCT/EP2016/068093 (in French; no English translation presently is available).
U.S. Appl. No. 15/572,885, filed May 17, 2016, C. Blanc.
Nov. 3, 2016 International Search Report and Written Opinion in International Patent Appln. No. PCT/EP2016/068093.

* cited by examiner

STACK FOR MANUFACTURING BIPOLAR PLATES FOR FUEL CELLS

FIELD OF THE INVENTION

The present invention relates to the field of fuel cells, notably the field of fuel cells suitable for use in automotive vehicles.

RELATED ART

A fuel cell, of the solid electrolyte proton exchange membrane type (PEMFC) for example, usually comprises a stack of elementary cells forming generators, each of the cells being separated from the adjacent cells by bipolar plates. By way of example, a fuel cell is described in patent application US 2008/0292916.

BRIEF DESCRIPTION OF EMBODIMENTS OF THE INVENTION

The present invention relates more particularly to the field of manufacturing such bipolar plates.

According to one embodiment, a stack for the manufacture of bipolar plates for fuel cells is proposed, each bipolar plate comprising two superimposed sheets between which a filler material is inserted, the stack comprising bipolar plates and intermediate plates alternately.

At least one intermediate plate has a plurality of slots passing through it in the direction of its thickness.

Thus the deformation of the intermediate plate may be prevented.

At least some of the slots may extend from the edges of the intermediate plate, so as to form outwardly overhanging portions of the intermediate plate.

The slots of the intermediate plate may be formed in a topographic arrangement which is symmetrical about the centre of the intermediate plate.

At least some of the intermediate plates may have slots formed in different topographic arrangements.

At least some of the intermediate plates placed adjacent to some of the bipolar plates respectively may have slots formed in different topographic arrangements.

The sheets of the bipolar plates may have opposed grooves, the bottoms of which are adjacent, a layer of filler material being inserted between these bottoms.

BRIEF DESCRIPTION OF THE DRAWINGS

The present invention will be more readily understood from a method of manufacturing bipolar plates described as an example of embodiment and illustrated by the drawings, in which.

DETAILED DESCRIPTION OF EMBODIMENTS OF THE INVENTION

Figure 1:
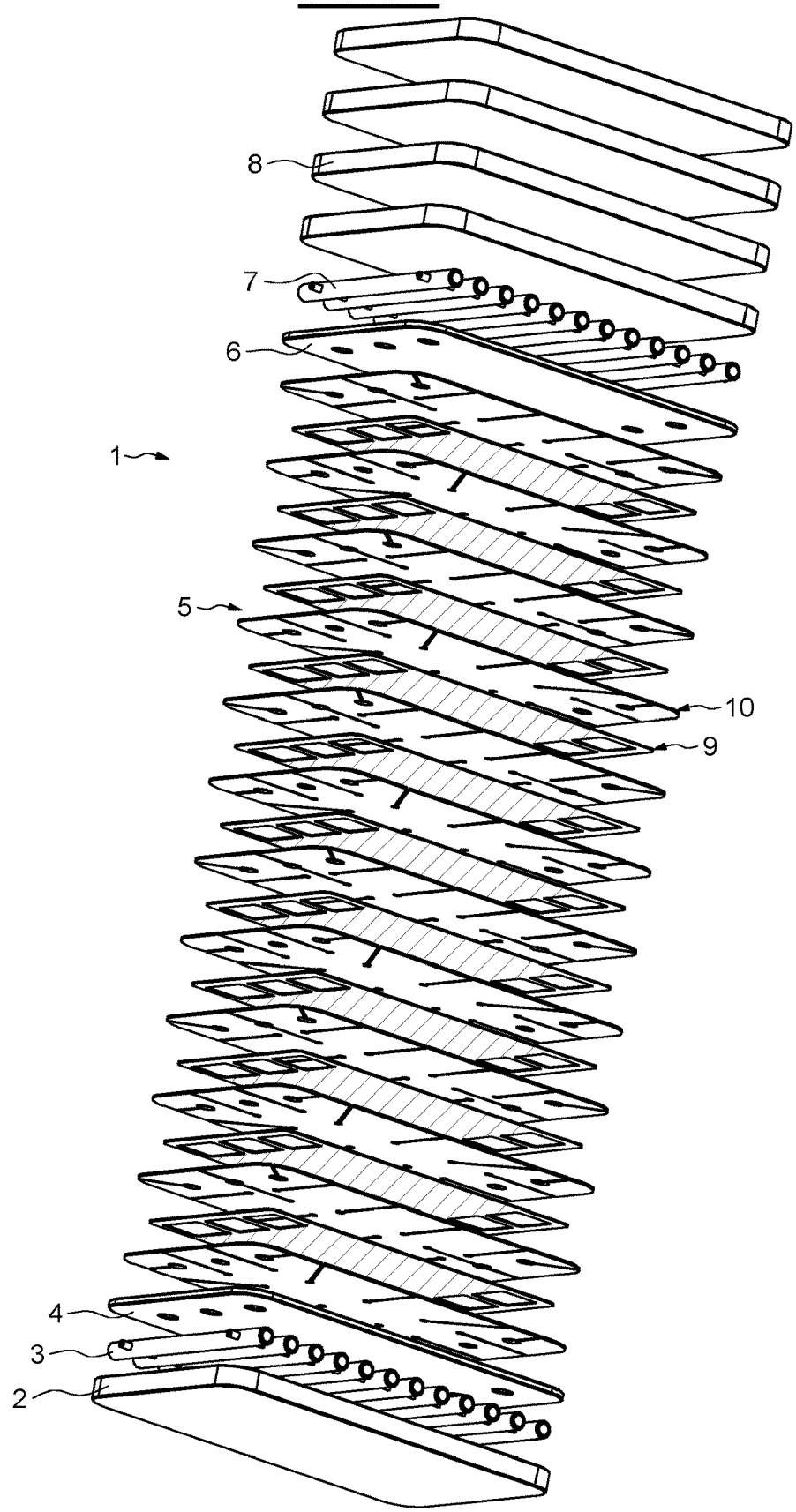
FIG. 1 shows a stacked assembly including bipolar plates and intermediate plates.

As shown in FIG. 1, a stacked assembly 1 comprises, from top to bottom, a thick lower support plate 2, a layer 3 of thermal decoupling tubes, a lower intermediate plate 4, a stack 5, an upper intermediate plate 6, a layer 7 of thermal decoupling tubes, and thick upper plates 8 superimposed.

The stack 5 alternately comprises bipolar plates 9, which are to be manufactured, separated by intermediate plates 10. The bipolar plates 9 and the intermediate plates 10 are rectangular, the intermediate plates 10 being larger than the bipolar plates 9, so that the intermediate plates 10 overhang the peripheral edge of the bipolar plates 9.

Figure 2:
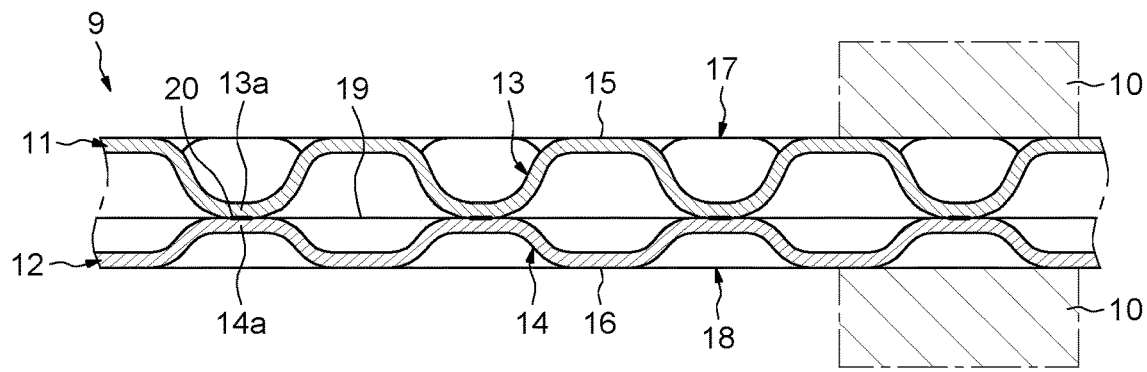
FIG. 2 shows a partial section through a bipolar plate.

As shown in FIG. 2, each bipolar plate 9 is formed, for example, by two superimposed pressed sheets 11 and 12.

The pressed sheets 11 and 12 are formed so as to create pluralities of opposed open grooves 13 and 14, having U-shaped cross sections with diverging symmetrical branches for example, which are set back from opposed flat areas 15 and 16 separating the grooves, these flat areas 15 and 16 creating parallel opposed faces 17 and 18 of the bipolar plate 9.

The adjacent flat bottoms 13a and 14a of the grooves 11 and 12 create a joint plane 19 parallel to the opposed faces 17 and 18. In this joint plane 19, and between the flat bottoms 13a and 14a respectively, a layer 20 of filler material is provided. This layer 20 may be formed by a cut sheet.

Figure 3:
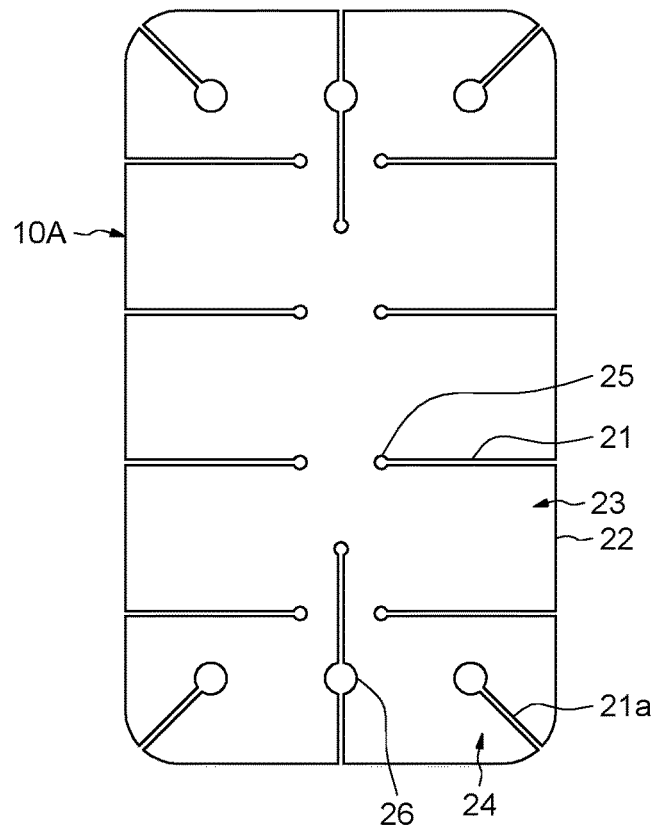
FIG. 3 shows a front view of an intermediate plate.

FIG. 3 shows an intermediate plate 10A which has a plurality of slots 21 passing through it in the direction of its thickness, these slots being formed by cutting.

The slots 21 extend from the edges 22 of the intermediate plate 10A into the central area of the plate, perpendicularly to these edges, so that the plate 10A is divided into smaller rectangular portions 23 separated by the slots 21 and outwardly overhanging, these portions 23 being joined to the central area of the plate 10A. The slots 21 may be distributed so that these portions 23 have, for example, approximately equal surface areas.

Slots 21a may be provided in the corners of the plate 10A, at 45° to the edges of the plate 10A, so as to delimit outwardly overhanging triangular portions 24. The inner ends of the slots 21 and/or 21a may also open into holes 25, and intermediate holes 26 intersecting some of the slots may be provided at a distance from the ends of these slots.

Preferably, the slots 21 and 21A are formed in a topographic arrangement which is symmetrical about the centre of the intermediate plate 10A.

Figure 4:
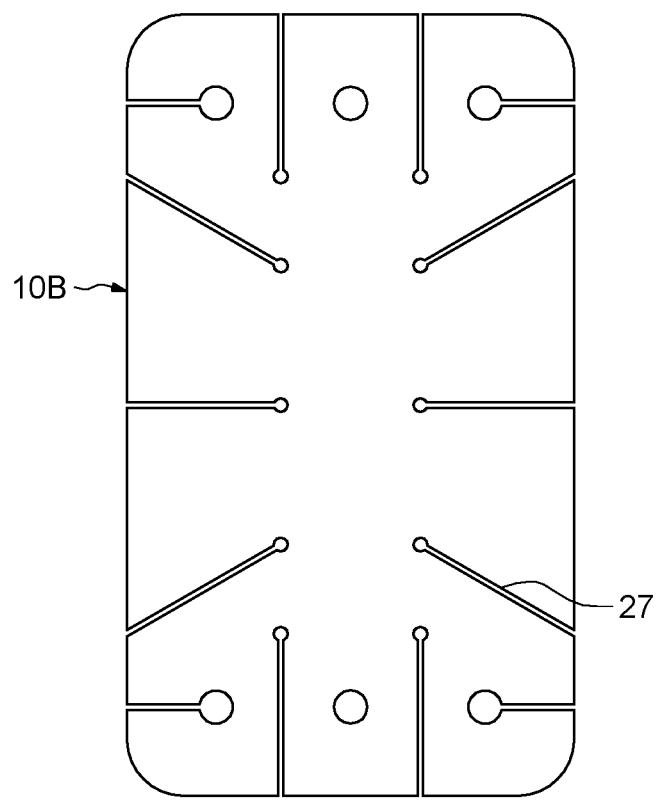
FIG. 4 shows a front view of another intermediate plate.

FIG. 4 shows an intermediate plate 10B which has a plurality of slots 27 passing through it in the direction of its thickness, these slots being formed by cutting.

The set of slots 27 of the intermediate plate 10B and the set of slots 21 and 21a of the intermediate plate 10A are formed and distributed in different topographic arrangements, so that, when the plates 10A and 10B are superimposed, the slots of the intermediate plate 10B are not superimposed on the slots of the intermediate plate 10A. However, when the plates 10A and 10B are superimposed, some of the slots of the intermediate plate 10B may intersect some of the slots of the intermediate plate 10A.

For example, as shown in FIG. 4, some of the slots 27 of the intermediate plate 10B are oblique relative to the edges of this plate 10B, while other slots are perpendicular to the edges of the intermediate plate 10B. In an equivalent way, in the intermediate plate 10A, the slots 27 delimit outwardly overhanging portions 28 joined to the central part of the intermediate plate 10B.

Here also, preferably, the slots 27 are formed in a topographic arrangement which is symmetrical about the centre of the intermediate plate 10B.

In the stack 5 of FIG. 1, it is advantageous for some intermediate plates 10 to be formed by intermediate plates 10A of FIG. 3 and for some others to be formed by intermediate plates 10B of FIG. 4. Preferably, the intermediate plates 10 of the stack 5 are formed by intermediate plates 10A and intermediate plates 10B alternately.

When the stacked assembly 1 has been formed, it is placed in a furnace to heat the layer 20 of filler material provided between the sheets 11 and 12, and the stacked assembly 1 is then cooled to cause the fixing of the sheets 11 and 12 of the bipolar plates 9.

The intermediate plates 10 provide, notably, the following advantages.

Because of the presence of the slots described previously, arranged in the intermediate plates 10, and preferably offset from one intermediate plate to the next in the stack 5, any deformations, notably those due to bending and/or buckling of the intermediate plates 10, are considerably reduced during the treatment in the furnace.

Consequently the pressures exerted on the faces 17 and 18 of the sheets 11 and 12 of each bipolar plate 9 by the adjacent intermediate plates 10 remain uniform or substantially uniform over their whole surface.

Consequently the pressures created between the adjacent flat bottoms 13a and 14a of the sheets 11 and 12, in the joint plane 19 containing the layer 20 of filler material, remain uniform or substantially uniform over their whole surface.

Consequently, during the brazing operation, the faces 17 and 18 of the sheets 11 and 12 of each bipolar plate 9 are kept parallel.

The stacked assembly 1 is then dismantled to obtain manufactured bipolar plates 9 whose faces 17 and 18 are parallel.

The manufactured bipolar plates 9 are intended to be inserted between elementary cells 4, forming electrochemical generators, so as to form a stack for fuel cells.

Since the opposed faces 17 and 18 of the bipolar plates 9 are parallel owing to the installation of the slotted intermediate plates 10, the tightness and electrical contacts of such a stack for fuel cells can be assured.

The invention claimed is:

1. A stack for manufacturing bipolar plates for fuel cells, the stack comprising:
   bipolar plates; and
   intermediate plates,
   wherein each of the bipolar plates includes first and second sheets arranged in a superimposed position relative to each other, with a layer of filler material arranged between the first and second sheets,
   wherein the intermediate plates include an intermediate plate having a plurality of slots passing therethrough in a direction of a thickness of the intermediate plate,
   wherein the bipolar plates are arranged alternately with the intermediate plates in the stack,
   wherein at least some of the slots extend from edges of the intermediate plate, so as to form outwardly overhanging portions of the intermediate plate that outwardly overhang a bipolar plate of the bipolar plates, and
   wherein each of the bipolar plates is adjacent to an intermediate plate of the intermediate plates.

2. The stack according to claim 1, wherein the slots of the intermediate plate are formed in a topographic arrangement that is symmetrical about a center of the intermediate plate.

3. The stack according to claim 1, wherein the intermediate plates include first and second intermediate plates each having a plurality of slots, the first intermediate plate having a topographic slot arrangement that is different from a topographic slot arrangement of the second intermediate plate.

4. The stack according to claim 2, wherein the intermediate plates include first and second intermediate plates each having a plurality of slots, the first intermediate plate having a topographic slot arrangement that is different from a topographic slot arrangement of the second intermediate plate.

5. The stack according to claim 3, wherein the first and second intermediate plates are positioned adjacent to and sandwich one of the bipolar plates therebetween.

6. The stack according to claim 4, wherein the first and second intermediate plates are positioned adjacent to and sandwich one of the bipolar plates therebetween.

7. The stack according to claim 1, wherein the first and second sheets of each of the bipolar plates are structured to have opposed grooves, the opposed grooves having bottom portions that are aligned to face each, and the layer of filler material being positioned between the bottom portions of the opposed grooves of the first and second sheets.

8. The stack according to claim 2, wherein the first and second sheets of each of the bipolar plates are structured to have opposed grooves, the opposed grooves having bottom portions that are aligned to face each, and the layer of filler material being positioned between the bottom portions of the opposed grooves of the first and second sheets.

9. The stack according to claim 3, wherein the first and second sheets of each of the bipolar plates are structured to have opposed grooves, the opposed grooves having bottom portions that are aligned to face each, and the layer of filler material being positioned between the bottom portions of the opposed grooves of the first and second sheets.

10. The stack according to claim 5, wherein the first and second sheets of each of the bipolar plates are structured to have opposed grooves, the opposed grooves having bottom portions that are aligned to face each, and the layer of filler material being positioned between the bottom portions of the opposed grooves of the first and second sheets.

* * * * *